(12) United States Patent
Chen

(10) Patent No.: US 12,164,787 B2
(45) Date of Patent: Dec. 10, 2024

(54) MICROCONTROLLER AND MEMORY CONTROL METHOD THEREOF

(71) Applicant: Nuvoton Technology Corporation, Hsinchu (TW)

(72) Inventor: I-Ching Chen, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 247 days.

(21) Appl. No.: 17/968,801

(22) Filed: Oct. 19, 2022

(65) Prior Publication Data

US 2023/0205434 A1 Jun. 29, 2023

(30) Foreign Application Priority Data

Dec. 28, 2021 (TW) .................................. 110149048

(51) Int. Cl.
*G06F 3/06* (2006.01)

(52) U.S. Cl.
CPC .......... *G06F 3/0625* (2013.01); *G06F 3/0653* (2013.01); *G06F 3/0683* (2013.01)

(58) Field of Classification Search
CPC .... G06F 3/0625; G06F 3/0653; G06F 3/0683; G06F 1/3275; G06F 3/0634; G06F 1/04; G06F 1/3243; Y02D 10/00

USPC ......................................................... 711/156
See application file for complete search history.

(56) References Cited

U.S. PATENT DOCUMENTS

2020/0257352 A1    8/2020   Hanson et al.

FOREIGN PATENT DOCUMENTS

| CN | 104700886 | 6/2015 |
|---|---|---|
| TW | 200813737 | 3/2008 |
| TW | 201721356 | 6/2017 |
| TW | 201729207 | 8/2017 |
| TW | 201735024 | 10/2017 |
| TW | 202105180 | 2/2021 |
| TW | I721003 | 3/2021 |

*Primary Examiner* — Charles Rones
*Assistant Examiner* — Han V Doan
(74) *Attorney, Agent, or Firm* — JCIPRNET

(57) ABSTRACT

A microcontroller and a memory control method for the microcontroller are provided. The microcontroller includes a memory array, multiple memory controllers, and multiple counting controllers. The memory array includes multiple memory segments. The counting controllers count based on a memory clock to generate count values, respectively. When a count value reaches a preset value, a counting controller corresponding to the count value controls a corresponding memory controller to enter a power saving mode. When receiving an operation command, the counting controller resets the count value and controls the corresponding memory controller to enter an operation mode.

20 Claims, 6 Drawing Sheets

MICROCONTROLLER AND MEMORY CONTROL METHOD THEREOF

CROSS-REFERENCE TO RELATED APPLICATION

This application claims the priority benefit of Taiwan application serial no. 110149048, filed on Dec. 28, 2021. The entirety of the above-mentioned patent application is hereby incorporated by reference herein and made a part of this specification.

BACKGROUND

Technology Field

The disclosure relates to a microcontroller and a memory control method for the microcontroller, and particularly to a microcontroller with low power consumption during operation and a memory control method for the microcontroller.

Description of Related Art

Microcontrollers may be disposed in an electronic device as the data processing core of the electronic device. To reduce the power consumption of the electronic device, the power consumption of the microcontrollers also needs to be reduced. Generally speaking, microcontrollers provide built-in memory components (e.g., components including static random access memory (SRAM)) for fast data access. When an electronic device is in a shutdown state or in a sleep state, the microcontroller may shut down the operation of the memory components, thereby achieving a power saving effect. However, the power saving effect can only be implemented when the electronic device is in a shutdown state or in a sleep state.

SUMMARY

The disclosure provides a microcontroller capable of having low power consumption during operation and a memory control method for the microcontroller.

The microcontroller of the disclosure includes a memory array, a plurality of memory controllers, and a plurality of counting controllers. The memory array includes multiple memory segments. The memory controllers are correspondingly coupled to the memory segments. The memory controllers operate a corresponding memory segment of the memory segments in an operation mode, respectively. The counting controllers are correspondingly coupled to the memory controllers. The counting controllers count based on a memory clock to generate a count value. When the count value reaches a preset value, the counting controllers control a corresponding memory controller to enter a power saving mode to stop operating the corresponding memory segment of the memory controllers. Moreover, when an operation command is received, the counting controllers reset the count value and control the corresponding memory controller to enter the operation mode.

The memory control method of the disclosure is adapted to control an internal memory of a microcontroller. The microcontroller includes a memory array, multiple memory controllers, and multiple counting controllers. The memory array includes multiple memory segments. The memory controllers are correspondingly coupled to the memory segments. The counting controllers are correspondingly coupled to the memory controllers. The memory control method includes steps as follows. The counting controllers receive a memory clock and count based on the memory clock to generate a count value, respectively. When a count value of a corresponding counting controller of the counting controllers reaches a preset value, a corresponding memory controller of the memory controllers is controlled to enter a power saving mode to stop operating a corresponding memory segment of the memory segments. Moreover, when the corresponding counting controller receives an operation command, the count value is reset and the corresponding memory controller is controlled to enter an operation mode, so that the corresponding memory controller operates the corresponding memory segment according to the operation command.

In summary, the counting controller counts based on the memory clock to generate a count value. When the count value reaches the preset value, the counting controller controls the corresponding memory controller to enter the power saving mode. Therefore, the corresponding memory controller and the corresponding memory segment may not be operated. Accordingly, the power consumption of the corresponding memory controller and the corresponding memory segment can be saved. Once the operation command is received, the counting controller resets the count value and controls the corresponding memory controller to enter the operation mode. Accordingly, the microcontroller can reduce the power consumption of the memory controllers and the memory segments not in frequent use during operation.

In order to make the features and advantages of the disclosure comprehensible, embodiments accompanied with drawings are described in detail below.

DESCRIPTION OF THE EMBODIMENTS

Figure 1:
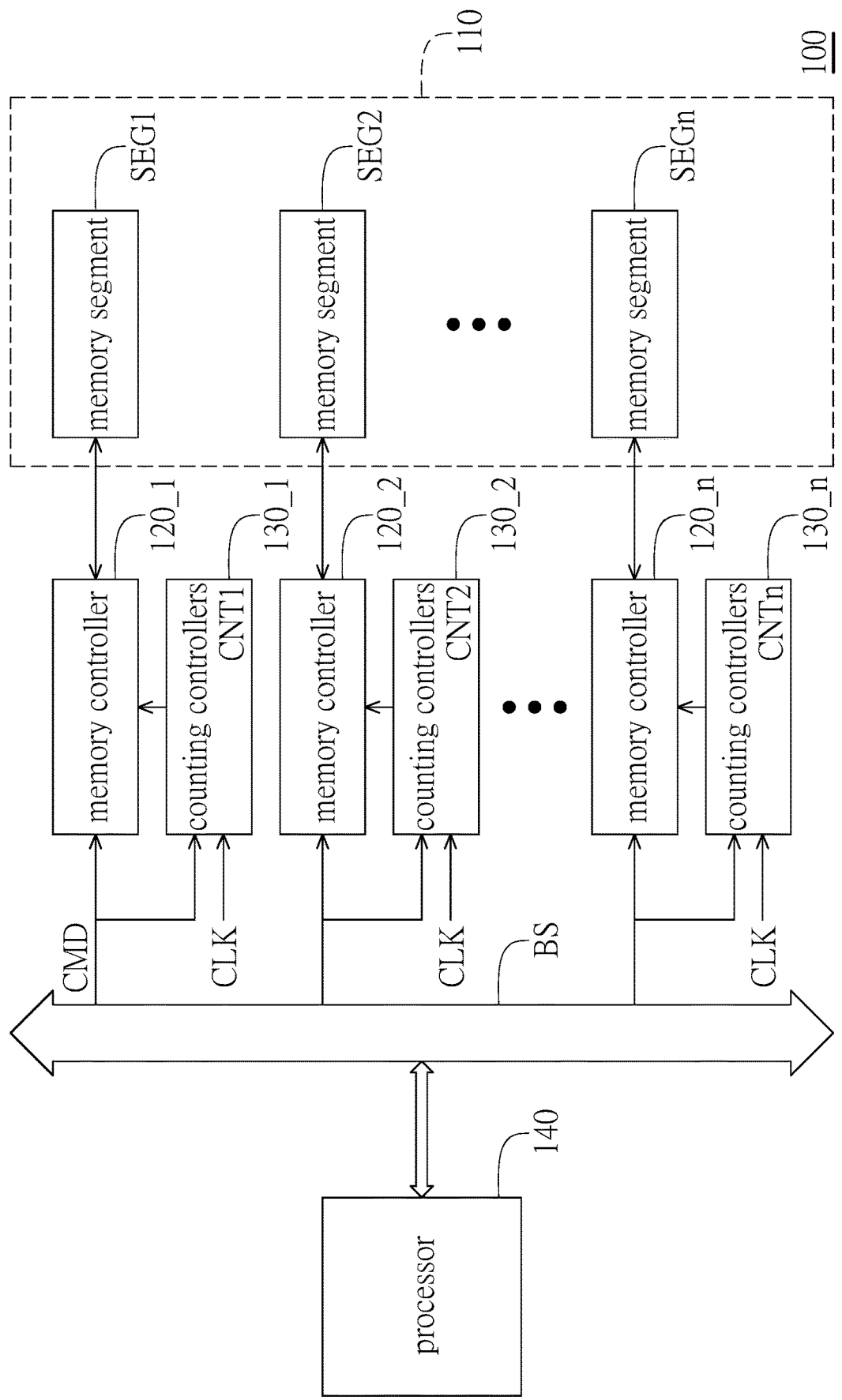
FIG. 1 is a schematic view of a microcontroller according to a first embodiment of the disclosure.

Some embodiments of the disclosure will be described in detail with reference to the accompanying drawings. For reference numerals cited in the following descriptions, the same reference numerals appearing in different drawings are regarded as the same or similar components. The embodiments are only a part of the disclosure and do not disclose all possible implementations of the disclosure. More precisely, the embodiments are merely examples of the device and the method.

Referring to FIG. 1. FIG. 1 is a schematic view of a microcontroller according to a first embodiment of the disclosure. In the embodiment, a microcontroller 100 includes a memory array 110, memory controllers 120_1 to 120_$n$, and counting controllers 130_1 to 130_$n$. The memory array 110 includes memory segments SEG1 to SEGn. The memory segments SEG1 to SEGn include multiple static random access memory (SRAM) cells, for example, but the disclosure is not limited thereto. The memory controllers 120_1 to 120_n are correspondingly coupled to the memory segments SEG1 to SEGn. The memory controllers 120_1 to 120_n operate the corresponding memory segments of the memory segments SEG1 to SEGn respectively in the operation mode. Taking the embodiment as an example, the memory controller 120_1 is coupled to the memory segment SEG1. The memory controller 120_1 operates the memory segment SEG1 in the operation mode. The memory controller 120_2 is coupled to the memory segment SEG2. The memory controller 120_2 operates the memory segment SEG2 in the operation mode. Similarly, it may be analogically reasoned that the memory controller 120_n is coupled to the memory segment SEGn. The memory controller 120_n operates the memory segment SEGn in the operation mode.

In some embodiments, the memory controller 120_1 is coupled to the memory segments SEG1 and SEG2. The memory controller 120_n operates the memory segments SEG1 and SEG2 in the operation mode. The disclosure is not limited to the corresponding coupling manners of the memory controllers 120_1 to 120_n and the memory segments SEG1 to SEGn in FIG. 1.

In the embodiment, the counting controllers 130_1 to 130_n are correspondingly coupled to the memory controllers 120_1 to 120_n. Taking the embodiment as an example, the counting controller 130_1 is coupled to the memory controller 120_1. The counting controller 130_2 is coupled to the memory controller 120_2, and so on. The counting controllers 130_1 to 130_n count based on a memory clock CLK to generate count values CNT1 to CNTn. The counting controllers 130_1 to 130_n respectively determine the mode of the corresponding memory controllers according to the count values CNT1 to CNTn and an operation command CMD.

Taking the counting controller 130_1 as an example, when the count value CNT1 has not reached a preset value, the counting controller 130_1 may continue to count based on the memory clock CLK. When the count value CNT1 reaches the preset value, the counting controller 130_1 may control the memory controller 120_1 to enter a power saving mode. Therefore, the memory controller 120_1 stops operating the memory segment SEG1. When the counting controller 130_1 receives the operation command CMD, the counting controller 130_1 may reset the count value CNT1 and control the memory controller 120_1 to enter the operation mode. Therefore, the memory controller 120_1 operates the memory segment SEG1 according to the operation command CMD.

The memory array 110, the memory controllers 120_1 to 120_n, and the counting controllers 130_1 to 130_n can be regarded as internal memory determining circuits of the microcontroller 100. The memory clock CLK can be a clock provided inside the microcontroller 100.

When the operation command CMD is received before the count value CNT1 reaches the preset value, the counting controller 130_1 may also reset the count value CNT1. Therefore, the time during which the memory controller 120_1 is in the operating mode may be prolonged.

In the embodiment, the counting controllers 130_1 to 130_n count the number of times of the memory clock CLK. Therefore, the count values CNT1 to CNTn may be related to the length of time when the memory controllers 120_1 to 120_n do not receive the operation command CMD. Derived from the example, when the count value CNT1 reaches the preset value, the memory segment SEG1 may be regarded as a memory segment not in frequent use. The memory controller 120_1 is controlled to enter the power saving mode. Therefore, the power consumption of the memory controller 120_1 and the memory segment SEG1 can be saved. In addition, other memory controllers may be in the operation mode. Accordingly, during operation, the microcontroller 100 can reduce the power consumption of the memory controllers and the memory segments not in frequent use. In the embodiment, once the operation command CMD is received, the counting controller 130_1 resets the count value CNT1 to the initial count value and controls the memory controller 120_1 to enter the operation mode.

In the embodiment, the memory controllers 120_1 to 120_n may stop operating in the power saving mode. Therefore, the memory segments SEG1 to SEGn may not be subjected to at least one of the write operation, the read operation, and the refresh operation in the power saving mode. In the power saving mode, the memory segments SEG1 to SEGn only consume the minimum power for storing data to prevent data loss, but the disclosure is not limited thereto. In some embodiments, the memory segments SEG1 to SEGn may be disabled. Therefore, the memory segments SEG1 to SEGn may not save data in the power saving mode.

In the embodiment, the microcontroller 100 further includes a processor 140 and a bus BS. The processor 140 can provide the memory controller 120_1 and the counting controller 130_1 with the operation command CMD through the bus BS, so that the memory controller 120_1 operates the memory segment SEG1. For example, the bus BS may be an AHB bus (the disclosure is not limited thereto). The processor 140 may be a central processing unit (CPU), for example.

Figure 2:
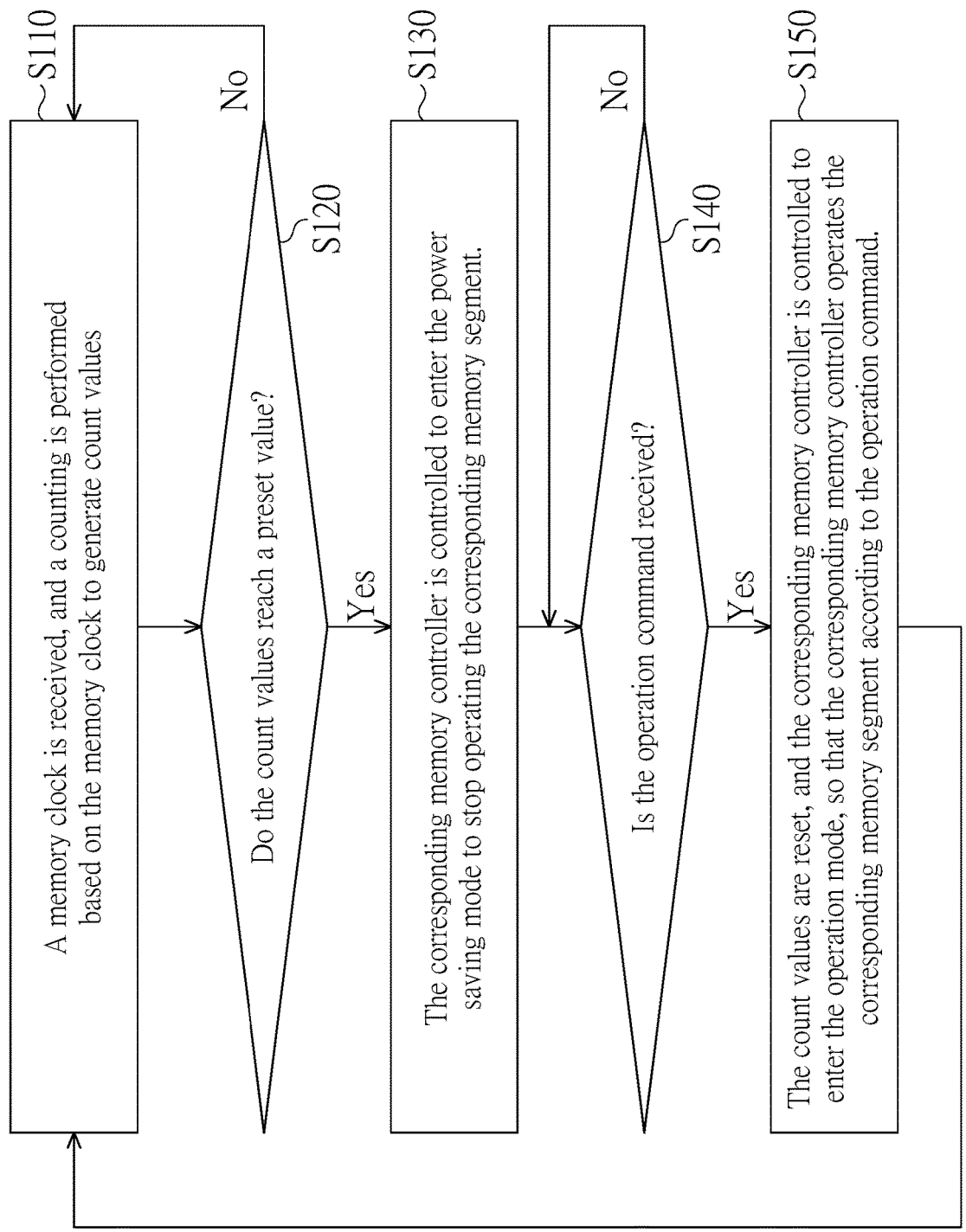
FIG. 2 is a flowchart illustrating a memory control method according to an embodiment of the disclosure.

Referring to both FIG. 1 and FIG. 2. FIG. 2 is a flowchart illustrating a memory control method according to an embodiment of the disclosure. In the embodiment, the memory control method is adapted for the internal memory determining circuit of the microcontroller 100. In step S110, the counting controllers 130_1 to 130_n count the number of times of the memory clock CLK to generate count values CNT1 to CNTn. In step S120, the counting controllers 130_1 to 130_n determine whether the count values CNT1 to CNTn reach the preset value. Taking the counting controller 130_1 as an example, when the count value CNT1 has not reached the preset value, the counting controller 130_1 may return to step S110 to resume counting. When the count value CNT1 reaches the preset value, the counting controller 130_1 controls the memory controller 120_1 to enter the power saving mode from the operation mode in step S130, so that the memory controller 120_1 stops operating the memory segment SEG1.

When the counting controller 130_1 receives the operation command CMD between step S110 and step S120, the counting controller 130_1 resets the count value CNT1. The memory controller 120_1 stays in the operation mode.

In step S140, the counting controller 130_1 may determine whether the operation command CMD is received. When no operation command CMD is received, the counting controller 130_1 returns to step S140 to resume waiting for the operation command CMD. That is, when the memory controller 120_1 is in the power saving mode, when no operation command CMD is received, the memory controller 120_1 may stay in the power saving mode. On the other hand, in step S140, when the operation command CMD is received, the counting controller 130_1 may reset the count value CNT1 in step S150. In step S150, the counting controller 130_1 also controls the memory controller 120_1 to enter the operation mode, so that the memory controller 120_1 operates the memory segment SEG1 according to the operation command CMD.

The implementation details of the memory control method can be sufficiently taught in the embodiment of FIG. 1, which is not repeated herein.

Figure 3:
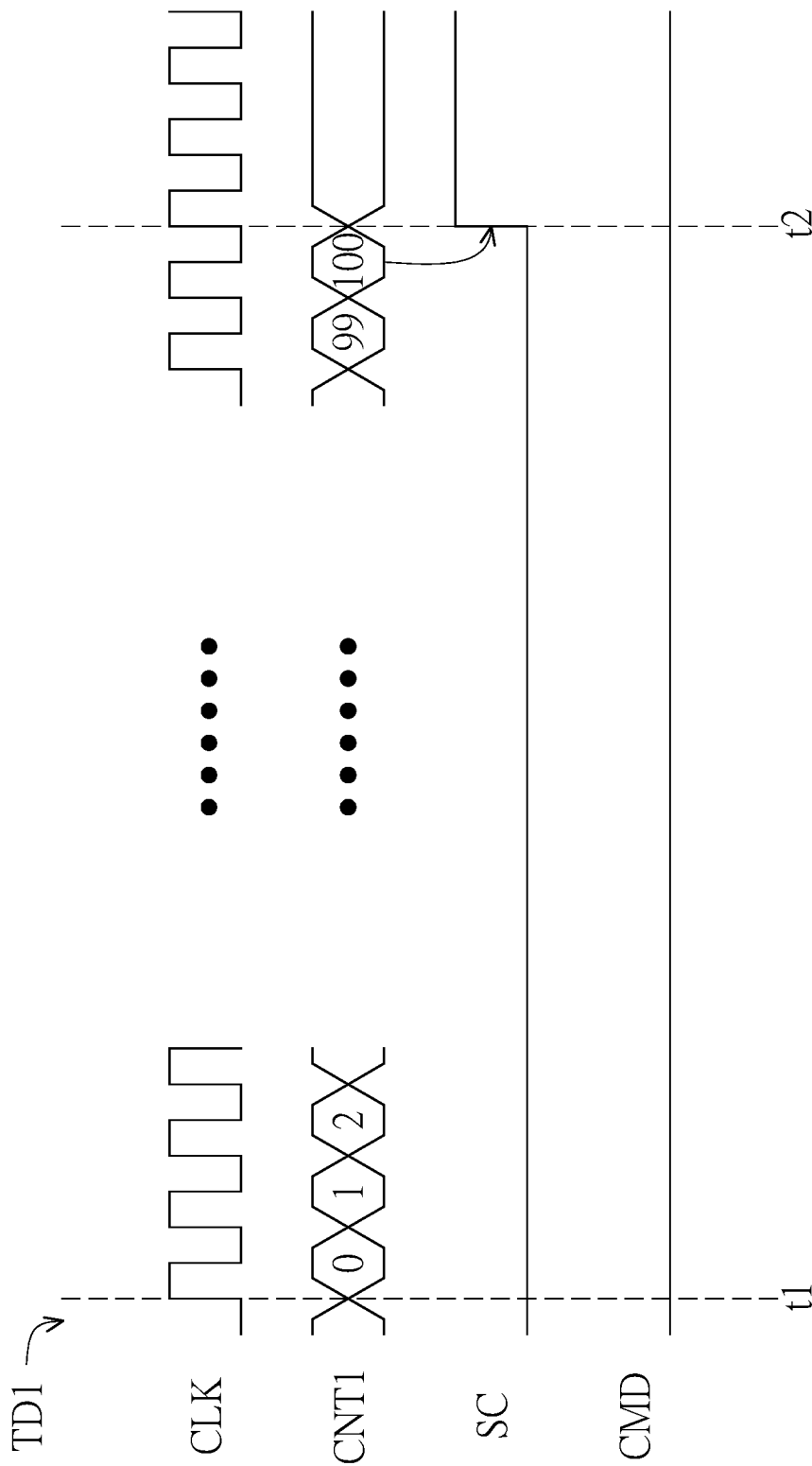
FIG. 3 is a first timing diagram according to an embodiment of the disclosure.

Referring to both FIG. 1 and FIG. 3. FIG. 3 is a first timing diagram according to an embodiment of the disclosure. The first timing diagram TD1 illustrates the timings of multiple signals when the counting controller 130_1 controls the memory controller 120_1 to enter the power saving mode from the operation mode. In the embodiment, the counting controller 130_1 starts to count the number of times of the memory clock CLK at the time point t1 to generate the count value CNT1. In the embodiment, the counting controller 130_1 can perform the counting in response to the rising edge of the memory clock CLK. The counting controller 130_1 compares the count value CNT1 with the preset value. When the counting controller 130_1 determines that the count value CNT1 reaches the preset value, the counting controller 130_1 provides a control signal SC (i.e., the first control signal) having the first voltage level. The memory controller 120_1 enters the power saving mode in response to the control signal SC having the first voltage level.

Taking the embodiment as an example, the counting controller 130_1 counts the number of times of the memory clock CLK in an incremental manner. The default value is set to "100". When it is determined that the count value CNT1 is determined to be greater than or equal to "100" at the time point t2, the counting controller 130_1 may provide the control signal SC having a high voltage level at the time point t2. Therefore, the memory controller 120_1 enters the power saving mode in response to the control signal SC having a high voltage level.

In some embodiments, after the time point t2, the counting controller 130_1 does not count the memory clock CLK. That is, once the count value CNT1 reaches the preset value, the count value CNT1 may not change until the counting controller 130_1 receives the operation command CMD. In some embodiments, after the time point t2, the counting controller 130_1 continues to count the memory clock CLK.

Figure 4:
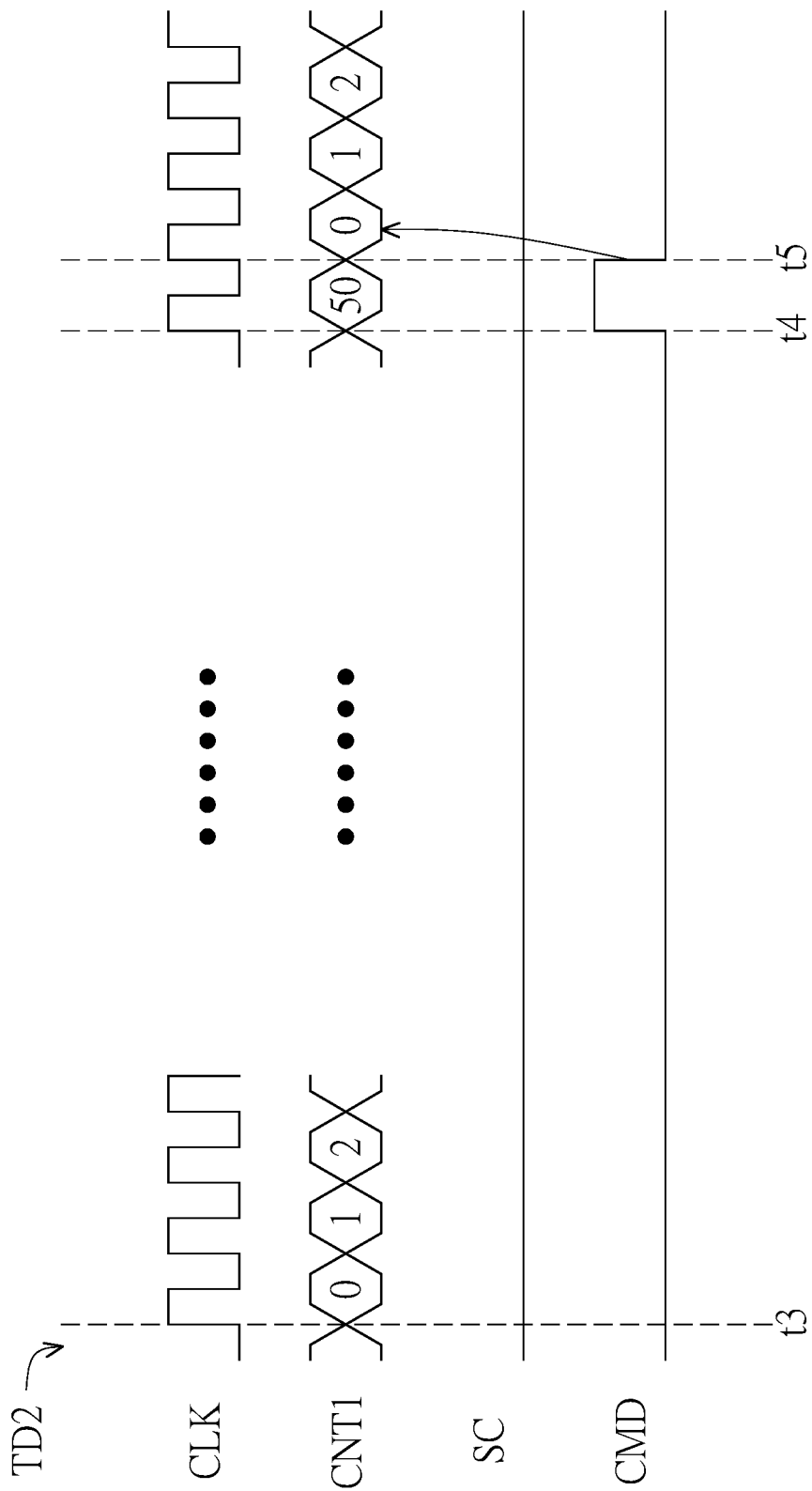
FIG. 4 is a second timing diagram according to an embodiment of the disclosure.

Referring to both FIG. 1 and FIG. 4. FIG. 4 is a second timing diagram according to an embodiment of the disclosure. The second timing diagram TD2 illustrates the timing when the count value CNT1 is reset. In the embodiment, when the counting controller 130_1 determines that the count value CNT1 reaches the preset value before receiving the operation command CMD, the counting controller 130_1 may reset the count value CNT1 and perform the counting based on the memory clock CLK.

Taking the embodiment as an example, the counting controller 130_1 counts the number of times of the memory clock CLK in an incremental manner. The default value is set to "100". The counting controller 130_1 starts to count the number of times of the memory clock CLK at the time point t3 to generate the count value CNT1. Between time point t4 and time point t5, the counting controller 130_1 receives the operation command CMD. Therefore, the counting controller 130_1 may reset the count value CNT1 to the initial count value (e.g., "0") at the time point t5 and perform a counting based on the memory clock CLK.

In some embodiments, the counting controller 130_1 may recognize signals. When it is recognized that a signal is the operation command CMD, the counting controller 130_1 may reset the count value CNT1 and perform a counting based on the memory clock CLK.

Figure 5:
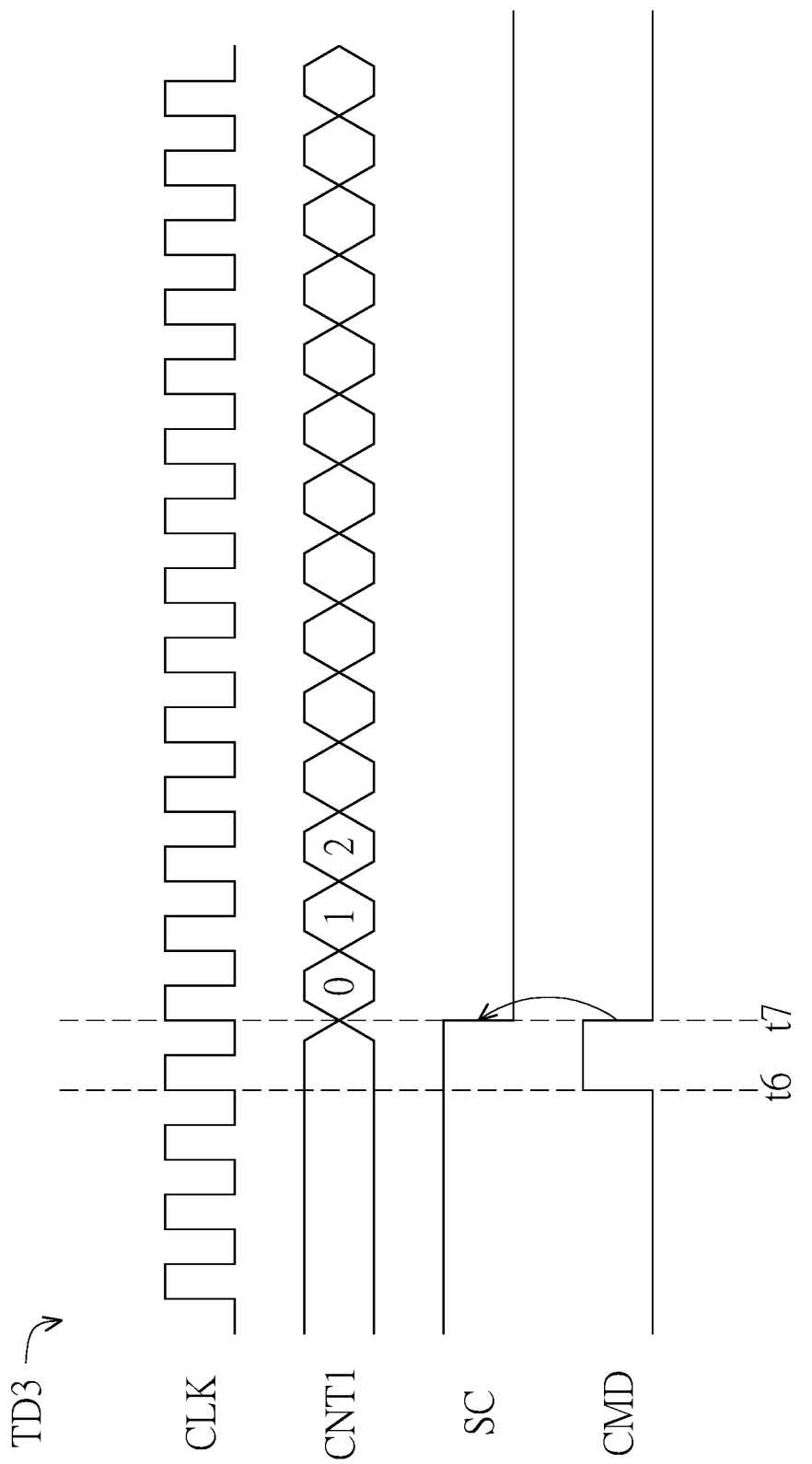
FIG. 5 is a third timing diagram according to an embodiment of the disclosure.

Referring to both FIG. 1 and FIG. 5. FIG. 5 is a third timing diagram according to an embodiment of the disclosure. The third timing diagram TD3 illustrates the timings of multiple signals when the counting controller 130_1 controls the memory controller 120_1 to enter the operation mode from the power saving mode. In the embodiment, before the time point t6, the control signal SC has the first voltage level. The first voltage level is a high voltage level, for example. Therefore, the memory controller 120_1 is in the power saving mode. Between time point t6 and time point t7, the counting controller 130_1 receives the operation command CMD. Therefore, at the time point t7, the counting controller 130_1 provides the control signal SC (i.e., the second control signal) having the second voltage level. The second voltage level is a low voltage level, for example. Therefore, the memory controller 120_1 is awakened from the power saving mode in response to the control signal SC having the second voltage level and thus enters the operation mode.

In addition, at the time point t7, the counting controller 130_1 resets the count value CNT1 to the initial count value (e.g., "0") and performs a counting based on the memory clock CLK.

In the first timing diagram TD1, the second timing diagram TD2, and the third timing diagram TD3, the number of times of the memory clock CLK is counted in an incremental manner. That is, in the counting process, the count value CNT1 is gradually increased. Once the count value CNT1 is increased to the preset value, the counting controller 130_1 controls the memory controller 120_1 to enter the power saving mode. In some embodiments, the counting controller 130_1 may count the number of times of the memory clock CLK in a decremental manner. That is, in the counting process, the count value CNT1 is gradually reduced. Once the count value CNT1 is reduced to the preset value, the counting controller 130_1 controls the memory controller 120_1 to enter the power saving mode. Taking the embodiment of FIG. 1 as an example, the counting controllers 130_1 to 130_n count the number of times of the memory clock CLK in an incremental manner to generate the count values CNT1 to CNTn. In some embodiments, the counting controllers 130_1 to 130_n count the number of times of the memory clock CLK in a decremental manner to generate the count values CNT1 to CNTn. In some embodiments, some counting controllers of the counting controllers 130_1 to 130_n count the number of times of the memory clock CLK in an incremental manner to generate a count value. Other counting controllers of the counting controllers 130_1 to 130_n count the number of times of the memory clock CLK in a decremental manner to generate a count value.

Figure 6:
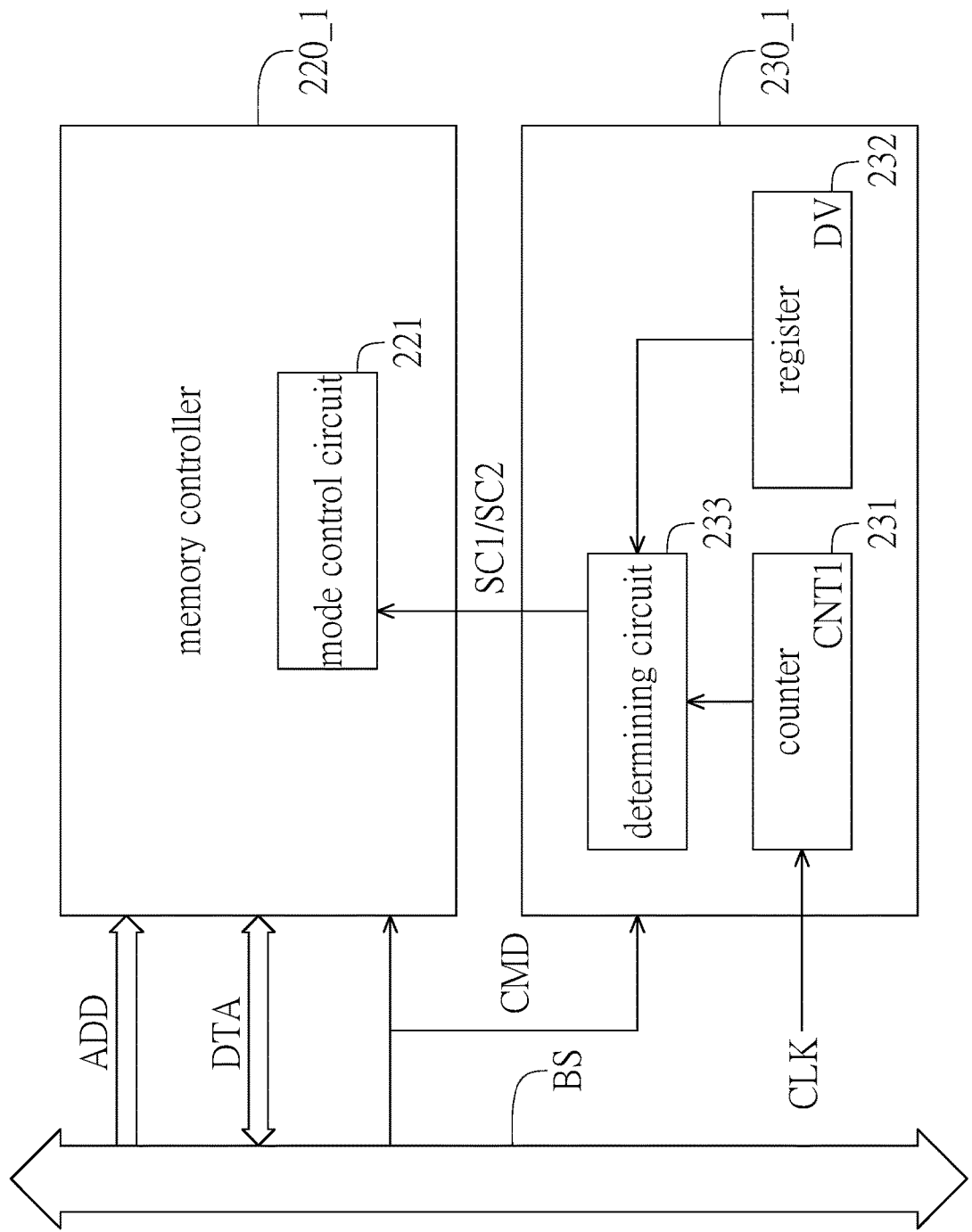
FIG. 6 is a schematic view of part of the microcontroller according to the second embodiment of the disclosure.

Furthermore, the implementation details of the memory controller and the counting controller are further illustrated. Referring to FIG. 6. FIG. 6 is a schematic view of part of the microcontroller according to the second embodiment of the disclosure. In the embodiment, for ease of description, only components such as the bus BS, the memory controller 220_1, and the counting controller 230_1 are illustrated in the embodiment. In the embodiment, the counting controller 230_1 includes a counter 231, a register 232, and a determining circuit 233. The counter 231 receives the memory clock CLK and counts the number of times of the memory clock CLK to generate the count value CNT1. The register 232 stores a preset value DV. The determining circuit 233 is coupled to the counter 231 and the register 232. The determining circuit 233 controls the mode of the memory controller 220_1 according to the count value CNT1 and the operation command CMD.

Furthermore, when the count value CNT1 is determined to reach the preset value DV, the determining circuit 233 provides the first control signal SC1. Therefore, the memory controller 220_1 enters the power saving mode in response to the first control signal SC1. In the power saving mode, the memory controller 220_1 may not operate the corresponding memory segment.

When the operation command CMD is received, the determining circuit 233 provides the second control signal SC2. Therefore, the memory controller 220_1 enters the operation mode in response to the second control signal SC2. In the operation mode, the memory controller 220_1 may receive the operation command CMD. If the operation command CMD is a write command, the memory controller 220_1 may write data DTA to the specified address of the corresponding memory segment according to an address ADD. If the operation command CMD is a read command, the memory controller 220_1 may read the data DTA of the specified address of the corresponding memory segment according to the address ADD.

In the embodiment, the memory controller 220_1 includes a mode control circuit 221. The mode control circuit 221 controls the memory controller 220_1 to enter the power saving mode in response to the first control signal SC1. In addition, the mode control circuit 221 also controls the memory controller 220_1 to enter the operation mode in response to the second control signal SC2.

In the embodiment, the counting controller 230_1 adjusts the initial count value according to the frequency of resetting the count value CNT1. For example, the counter 231 counts the number of times of the memory clock CLK in an incremental manner. When the frequency of resetting the count value CNT1 increases, it indicates that the memory segment corresponding to the counting controller 230_1 is the memory segment in frequent use. The counting controller 230_1 reduces the initial count value. Therefore, the difference between the initial count value and the preset value DV gets greater. Accordingly, the memory controller 220_1 may reduce the frequency of switching between the power saving mode and the operation mode, thereby preventing the reduction of reading efficiency. On the other hand, when the frequency of resetting the count value CNT1 decreases, it indicates that the memory segment corresponding to the counting controller 230_1 is the memory segment not in frequent use. The counting controller 230_1 may increase the initial count value. Therefore, the difference between the initial count value and the preset value DV gets smaller. Accordingly, the memory controller 220_1 enters the power saving mode in advance, thereby improving the power saving effect.

In the embodiment, the counting controller 230_1 adjusts the preset value DV stored in the register 232 according to the frequency of resetting the count value CNT1. For example, the counter 231 counts the number of times of the memory clock CLK in an incremental manner. When the frequency of resetting the count value CNT1 increases, it indicates that the memory segment corresponding to the counting controller 230_1 is the memory segment in frequent use. The counting controller 230_1 may increase the preset value DV. Therefore, the difference between the initial count value and the preset value DV gets greater. Accordingly, the memory controller 220_1 may reduce the frequency of switching between the power saving mode and the operation mode, thereby preventing the reduction of reading efficiency. On the other hand, when the frequency of resetting the count value CNT1 decreases, the counting controller 230_1 may decrease the preset value DV. Therefore, the difference between the initial count value and the preset value DV gets smaller. Accordingly, the memory controller 220_1 enters the power saving mode in advance, thereby improving the power saving effect.

In summary, the counting controller counts based on the memory clock to generate a count value. When the count value reaches the preset value, the counting controller controls the corresponding memory controller to enter the power saving mode. Therefore, the corresponding memory controller and the corresponding memory segment may not be operated. Accordingly, the power consumption of the corresponding memory controller and the corresponding memory segment can be saved. Once the operation command is received, the counting controller resets the count value and controls the corresponding memory controller to enter the operation mode. Accordingly, the microcontroller can reduce the power consumption of the memory controllers and the memory segments not in frequent use during operation. In addition, the preset value can be adjusted according to the frequency of resetting the count value. Therefore, the memory controller corresponding to the memory segment in frequent use may reduce the frequency of switching between the power saving mode and the operation mode, thereby preventing the reduction of reading efficiency.

Although the disclosure has been described with reference to the above embodiments, they are not intended to limit the disclosure. It will be apparent to one of ordinary skill in the art that modifications and changes to the described embodiments may be made without departing from the spirit and the scope of the disclosure. Accordingly, the scope of the disclosure will be defined by the attached claims and their equivalents and not by the above detailed descriptions.

What is claimed is:
1. A microcontroller, comprising:
a memory array, comprising a plurality of memory segments;
a plurality of memory controllers correspondingly coupled to the memory segments, wherein each of the memory controllers is configured to operate a corresponding memory segment of the memory segments in an operation mode; and
a plurality of counting controllers correspondingly coupled to the memory controllers, wherein each of the counting controllers is configured to:
count based on a memory clock to generate a count value,
when the count value reaches a preset value, control a corresponding memory controller of the memory controllers to enter a power saving mode to stop operating the corresponding memory segment, and
when an operation command is received, reset the count value and control the corresponding memory controller to enter the operation mode.
2. The microcontroller according to claim 1, wherein a first counting controller of the counting controllers comprises:
a counter configured to receive the memory clock and counts a number of times of the memory clock to generate the count value;
a register configured to store the preset value; and
a determining circuit coupled to the counter and the register and configured to control a mode of a first memory controller of the memory controllers according to the count value and the operation command.

3. The microcontroller according to claim 2, wherein when the operation command is received, the first counting controller resets the count value and counts based on the memory clock.

4. The microcontroller according to claim 3, wherein in the operation mode, the first memory controller receives the operation command and performs at least one of a write operation, a read operation, and a refresh operation on the corresponding memory segment in response to the operation command.

5. The microcontroller according to claim 4, wherein:
when the count value reaches the preset value, the determining circuit provides a first control signal, and the first memory controller enters the power saving mode in response to the first control signal to, and
when the operation command is received, the determining circuit provides a second control signal, and the first memory controller enters the operation mode in response to the second control signal.

6. The microcontroller according to claim 5, wherein the first memory controller comprises:
a mode control circuit configured to control the first memory controller to enter the power saving mode in response to the first control signal and control the first memory controller to enter the operating mode in response to the second control signal.

7. The microcontroller according to claim 2, wherein the first counting controller adjusts the preset value stored in the register according to a frequency of resetting the count value.

8. The microcontroller according to claim 2, wherein:
the counter counts the number of times of the memory clock in an incremental manner,
when the frequency of resetting the count value increases, the first counting controller increases the preset value, and
when the frequency of resetting the count value decreases, the first counting controller decreases the preset value.

9. The microcontroller according to claim 2, wherein the first counting controller adjusts an initial count value according to a frequency of resetting the count value.

10. The microcontroller according to claim 9, wherein:
the counter counts the number of times of the memory clock in an incremental manner,
when the frequency of resetting the count value increases, the first counting controller decreases the initial count value, and
when the frequency of resetting the count value decreases, the first counting controller increases the initial count value.

11. The microcontroller according to claim 1, wherein at least one of the counting controllers counts a number of times of the memory clock in an incremental manner.

12. The microcontroller according to claim 1, wherein at least one of the counting controllers counts a number of times of the memory clock in a decremental manner.

13. A memory control method, adapted to control an internal memory of a microcontroller, wherein the microcontroller comprises a memory array, a plurality of memory controllers, and a plurality of counting controllers, wherein the memory array comprises a plurality of memory segments, wherein the memory controllers are correspondingly coupled to the memory segments, wherein the counting controllers are correspondingly coupled to the memory controllers, and the memory control method comprises:
receiving a memory clock and counting based on the memory clock to generate a count value through the counting controllers, respectively;
when a count value of a corresponding counting controller of the counting controllers reaches a preset value, controlling a corresponding memory controller of the memory controllers to enter a power saving mode to stop operating a corresponding memory segment of the memory segments; and
when the corresponding counting controller receives an operation command, resetting the count value and controlling the corresponding memory controller to enter an operation mode, so that the corresponding memory controller operates the corresponding memory segment according to the operation command.

14. The memory control method according to claim 13, further comprising:
when the operation command is received, resetting the count value and counting a number of times of the memory clock.

15. The memory control method according to claim 13, wherein the step of which the corresponding memory controller operates the corresponding memory segment according to the operation command comprises:
receiving the operation command through the corresponding memory controller and performing at least one of a write operation, a read operation, and a refresh operation on the corresponding memory segment in response to the operation command.

16. The memory control method according to claim 13, wherein the step of controlling the corresponding memory controller to enter the power saving mode when the count value of the corresponding counting controller reaches the preset value comprises:
providing a first control signal through the corresponding counting controller; and
entering the power saving mode through the corresponding memory controller in response to the first control signal.

17. The memory control method according to claim 13, wherein the step of resetting the count value and controlling the corresponding memory controller to enter the operation mode when the corresponding counting controller receives the operation command comprises:
providing a second control signal through the corresponding counting controller; and
entering the operation mode through the corresponding memory controller in response to the second control signal.

18. The memory control method according to claim 13, further comprising:
adjusting the preset value according to a frequency of resetting the count value.

19. The memory control method according to claim 13, further comprising:
adjusting an initial count value according to a frequency of resetting the count value.

20. The memory control method according to claim 13, wherein the step of counting based on the memory clock to generate the count value through the counting controllers comprises:
counting a number of times of the memory clock in either an incremental manner or a decremental manner.

* * * * *